United States Patent

Otake et al.

[11] Patent Number: 5,574,357
[45] Date of Patent: Nov. 12, 1996

[54] SWITCHING POWER SUPPLY

[75] Inventors: Tetsushi Otake, Tokyo; Noriyuki Yoshizawa, Kawagoe, both of Japan

[73] Assignee: Toko, Inc., Tokyo, Japan

[21] Appl. No.: 337,882

[22] Filed: Nov. 14, 1994

[30] Foreign Application Priority Data

| Nov. 12, 1993 | [JP] | Japan | 5-307520 |
| Jan. 14, 1994 | [JP] | Japan | 6-015843 |
| Sep. 16, 1994 | [JP] | Japan | 6-248632 |

[51] Int. Cl.$^6$ .............. G05F 1/10; G05F 1/652; G05F 1/613; H02M 7/217
[52] U.S. Cl. .............. 323/222; 323/224; 363/127
[58] Field of Search .............. 323/222, 266, 323/224; 363/127

[56] References Cited

U.S. PATENT DOCUMENTS

| 4,449,174 | 5/1984 | Ziesse | 363/21 |
| 4,546,304 | 10/1985 | Schwarz | 323/287 |
| 4,736,151 | 4/1988 | Dishner | 323/224 |
| 4,801,859 | 1/1989 | Dishner | 323/224 |
| 5,461,302 | 10/1995 | Garcia et al. | 323/222 |

FOREIGN PATENT DOCUMENTS

| 2-51357 | 8/1988 | Japan . |
| 4-105807 | 3/1992 | Japan . |

Primary Examiner—Peter S. Wong
Assistant Examiner—Bao Q. Vu
Attorney, Agent, or Firm—Dressler, Goldsmith, Milnamow & Katz, Ltd.

[57] ABSTRACT

A switching power supply with a high power-conversion-efficiency is obtained by further reducing a loss occurring in a transistor rectifying element. A driving transistor Q3 is arranged between a base of a transistor Q2 as the rectifying element and the ground. A driving signal is inputted from a connection point of the transistor Q2 and a choke coil L1 generating a flyback voltage to the base of the driving transistor Q3, and an ON ad OFF operation of the transistor Q2 is caused to synchronize with an ON ad OFF operation of the switching transistor Q1, thereby preventing a leakage of the current in direction of the base from the collector of the transistor Q2 when it turns off, reducing the loss of the transistor rectifying element and then, improving the power conversion efficiency of the switching power supply.

7 Claims, 4 Drawing Sheets

5,574,357

SWITCHING POWER SUPPLY

BACKGROUND OF THE INVENTION

1. Field of the Invention

The present invention relates to a switching power supply, reducing a loss when a rectifying element is conducting, to improve a power conversion efficiency.

2. Technical Background

Although a diode has been entirely used as a rectifying element for converting an A.C. voltage or current into D.C., in case of being rectified through the diode, it must be taken into consideration that a loss occurs, corresponding to the product of a forward dropping voltage $V_F$ and current in the diode.

On the other hand, from an object to reduce the loss of the rectifying element, as a saturated voltage between a collector and an emitter of a transistor being in an ON-state is less than the forward dropping voltage $V_F$ of the diode, it is known that the resulting loss becomes low.

Then, it has been considered that a transistor instead of a diode for the rectifying element may be used as a means for the improving power conversion efficiency of the switching power supply.

With respect to a switching power supply in which such a transistor rectifying element is used, inventors of the present application have proposed a switching power supply as shown in FIG. 1 of the present application in Japanese Patent Application No. 4-105807.

Detailed description of structures and operation of the circuit as shown in FIG. 1 is omitted, but the operation of a transistor Q2 as the transistor rectifying element is as follows:

When a switching transistor Q1 turns off, a current flowing through a path formed by an input terminal 1, a choke coil L1, a collector and an emitter of the switching transistor Q1 is cut off. Thus, a flyback voltage is generated in the choke coil L1, and a collector voltage of the switching transistor Q1 rises up to a voltage that the flyback voltage is added to an input voltage $V_{in}$. When a voltage that the flyback voltage and the input voltage $V_{in}$ are superposed inputs to an emitter of the transistor Q2, the transistor Q2 is forwardly biased and becomes an ON-state. When the transistor Q2 becomes on-state, the high voltage that the flyback voltage and the input voltage $V_{in}$ is superposed is supplied to a load RL through an output terminal 2.

On the contrary, when the switching transistor Q1 turns on, the collector voltage thereof and the emitter voltage of the transistor Q2 become low, and a forward bias between an emitter and a collector of the transistor Q2 is released and the transistor Q2 becomes an OFF-state. Like this, the transistor Q2 becomes the ON-state by that the switching transistor Q1 turns off and its output, that is, the collector voltage rises, and conversely, the transistor Q2 becomes the OFF-state by that the switching transistor Q1 turns on and its output, that is, the collector voltage drops. After all, in the circuit as shown in FIG. 1, the output of the switching transistor Q1 has become a signal for turning the transistor Q2 on and off.

SUMMARY OF THE INVENTION

It is possible to improve the power converting efficiency of the switching power supply by using a transistor instead of a diode as a rectifying element, but it is needed to perform an ON and OFF control, so that the transistor is different from the diode.

If a PNP type a transistor is used as a transistor rectifying element, the ON and OFF operation can be done in accordance with the operation of the switching transistor by only keeping a current path between a base of the transistor and the ground without arranging a specific driving circuit in the base of the transistor rectifying element. From this reason, in the switching power supply as shown in FIG. 1 a structure of the circuit is simple, and the switching power supply with a high efficiency has been realized, suppressing a rise of the cost.

It can be considered, however, that in the PNP transistor, from a structure of its P-N junction, two diodes are formed in both directions of a base from an emitter and a base from a collector of the PNP transistor. For that reason, in a simple circuit structure only keeping a current path between the base and the ground, a leak current forward the base from the collector is generated by reason that the voltage of the collector of the transistor rectifying element becomes higher than that of the base thereof when the switching transistor becomes an ON-state, an emitter voltage of a transistor rectifying element drops, and the transistor rectifying element becomes OFF-state.

As a loss of the transistor rectifying element increases because of this leak current, there is a difficulty in further improving the power converting efficiency of the switching power supply even if it becomes higher than the power converting efficiency of the switching power supply used the diode as the rectifying element.

Accordingly, a first object of the present invention is to provide a switching power supply in which a high power-converting-efficiency is realized by decreasing a loss generated in a transistor rectifying element in the switching power supply used a PNP type transistor rectifying element.

A second object of the present invention is to provide a switching power supply for suppressing, becoming an intermittent operation state when inputting an input voltage that is higher than an output voltage to be obtained and causing to act a voltage dropping operation.

Further, a third object of the present invention is to provide a switching power supply which can conduct a stabilized switching operation for an input voltage in a broad range.

Finally, a fourth object of the present invention is to provide a switching power supply which can prevent from keeping at a high voltage outputting state during a long time after starting when inputting a higher input voltage than an output voltage to be obtained to start the power supply.

In a switching power supply having, as its basic structure, for generating a flyback voltage in an inductive element when a switching element turns off, and obtaining a desired D.C. power by rectifying and smoothing an energy of the flyback voltage, a switching power supply according to the present invention comprises:

a transistor rectifying element consisting of a PNP type bipolar transistor, disposed between the inductive element and an output, which is in charge of a rectifying operation; and a driving transistor, including an NPN type bipolar transistor, connected between a base of a transistor rectifying element and a low potential point such as a ground, receiving an ON and OFF control signal from a connection point of the transistor rectifying element and the inductance element, thereby causing the transistor rectifying element to operate.

As various modifications, one is a switching power supply further comprising a capacitive element, connected to a base of the driving transistor, leading the control signal thereto from a connection point of the transistor rectifying element and the inductive element, in the basic switching power supply according to the present invention.

Another is a switching power supply further comprising the capacitive element, and a feedback circuit arranged between a collector and a base of the driving transistor in the basic switching power supply according to the present invention.

Further, another is a switching power supply further comprising a capacitive element, a feedback circuit including a resistor and a capacitor, and a diode connected between a connection point of the resister and the capacitor of the the feedback circuit, and the low potential point.

By such various circuits, in the switching power supply according to the present invention, obtained is the switching power supply suppressing an intermittent operation, and acting a stable switching operation over a wide range of an input voltage as well as decreasing a loss of a transistor rectifying element and obtaining a high power-conversion-efficiency.

In other words, in the switching power supply according to the present invention a PNP type transistor has been uses as a rectifying element. This invention is characterized in that the transistor rectifying element is ON and OFF controlled by a driving transistor receiving a control signal from a connection point of the transistor rectifying element and a choke coil. Thus, a loss occuring in the transistor rectifying element can be further reduced and the switching power supply with the high power-conversion-efficiency can be obtained.

The switching power supply according to the present invention has the following advantages other than the above advantage, by giving some modifications to the basic structure mentioned above.

By providing a capacitor leading the control signal to a base of the driving transistor, a switching power supply having a circuit structure of a booster chopper converter operating as a back-boost type converter can be used.

By providing a capacitor arranged in a base of the driving transistor and a feedback circuit arranged between a collector and the base thereof, a stable output voltage can be supplied without occurring an intermittent operation to an input voltage having a value of a high voltage.

By providing a capacitor, a feedback circuit and a diode disposed between a connection point of a resistor and a capacitor of the feedback circuit and a low potential point, an output voltage does not reach a state of a high output voltage over a long time.

DESCRIPTION OF THE PREFERRED EMBODIMENTS

Figure 1:
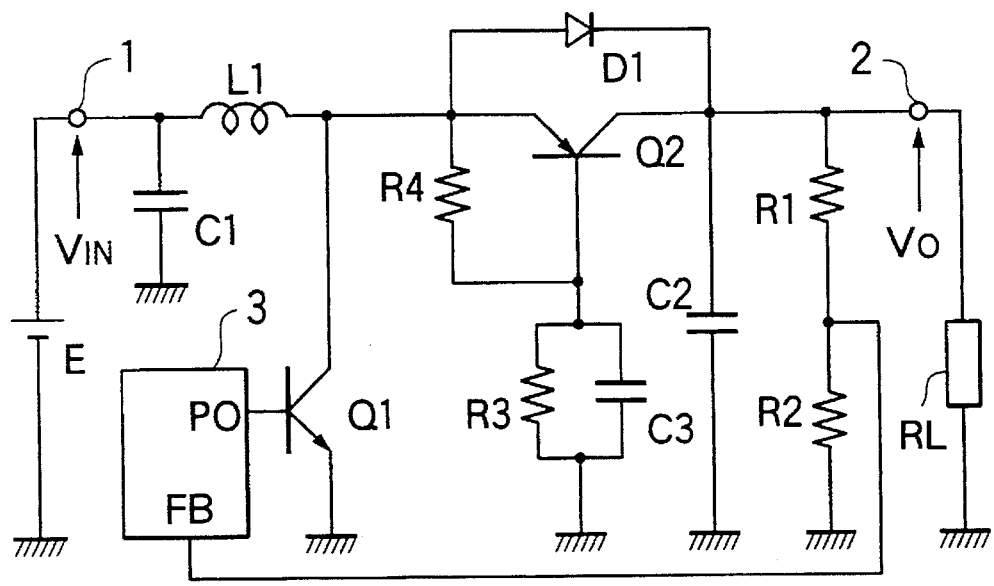
FIG. 1 shows a circuit of a conventional switching power supply used a transistor rectifying element.
Figure 2:
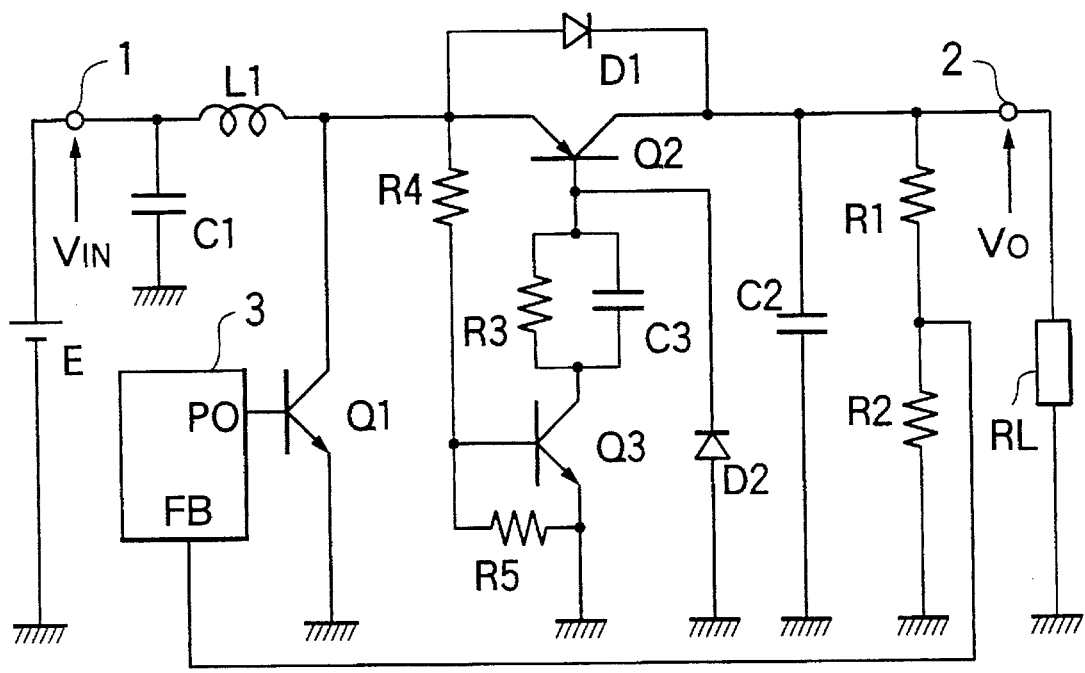
FIG. 2 shows a circuit of a switching power supply according to a first embodiment of the present invention.

FIG. 2 shows a circuit of a switching power supply according to a first embodiment of the present invention realized a switching power supply with a high power-conversion-efficiency, by reducing a loss occurring in a transistor rectifying element. It should be noted that the same structural elements in FIG. 2 as those shown in FIG. 1 are given the same reference numerals.

In FIG. 2, the reference numerals 1 and 2 show an input terminal and an output terminal at the high potential side, respectively and an input terminal and an output terminal at the low potential side are grounded in common. The input terminal 1 is connected to a collector of an NPN type switching transistor Q1 through a choke coil L1, and an emitter of the switching transistor Q1 is to the ground. The collector of the switching transistor Q1 is connected to an emitter of a PNP type transistor Q2 as a transistor rectifying element, and a collector of the transistor Q2 is to an output terminal 2. A capacitor C1 and a capacitor C2 are connected between the input and output terminals 1 and 2 and the ground, respectively and a series circuit comprising a resistors R1 and R2 for dividing an output voltage is further connected between the output terminal 2 and the ground.

The connection point of the resistors R1 and R2 is connected to a voltage detecting terminal (FB) of a control circuit 3, and a pulse output terminal (PO) of the control circuit 3 is to a base of the switching transistor Q1. The emitter of the transistor Q2 is connected to an anode of a diode D1, and a collector of the transistor Q2 is to an cathode of the a diode D1. A base of the transistor Q2 is connected to a collector of an NPN type driving transistor Q3 through a parallel circuit of a resistor R3 and a capacitor C3, and an emitter of the driving transistor Q3 is to the ground. The base of the transistor Q2 is further connected to a cathode of a diode D2, and an anode of the diode D2 is to the ground. A resistor R4 is connected between the emitter of the transistor Q2 and a base of the driving transistor Q3, and further a resistor R5 is between the base and the emitter of the driving transistor Q3.

The circuit structure as described above forms the so-called chop-up type switching power supply and an operation of this circuit is as follows:

When the switching transistor Q1 turns off by a signal from the control circuit 3, a flyback voltage generates in the choke coil L1 by the energy stored in an ON state of the switching transistor Q1. Accordingly, a high voltage that the flyback voltage generated in the choke coil is superposed on the input voltage $V_{in}$ would be applied to the collector of the switching transistor Q1 and the emitter of the transistor Q2 as the rectifying element.

This high voltage that the input voltage $V_{in}$ and the flyback voltage is superposed, is applied to the emitter of the transistor Q2, and also is inputted to the base of the driving transistor Q3 through the resistor R4, thereby turning on the driving transistor Q3 so that a forward bias is applied between the base and emitter of the driving transistor Q3. When the driving transistor Q3 becomes an ON state, a forward bias is applied between the base and emitter of the transistor Q2, thereby the transistor Q2 becomes an ON state. When the transistor Q2 becomes the ON state, the high voltage that the input voltage $V_{in}$ and the flyback voltage are superposed is supplied to a load RL.

Next, when the switching transistor Q1 turns on, voltages of the collector thereof and the emitter of the transistor Q2 drop and simultaneously a voltage of the base of the driving transistor Q3 also drops. Accordingly, the driving transistor Q3 turns off, the forward bias state between the emitter and the base of the transistor Q2 is released by turning-off of the driving transistor Q3, and the transistor Q2 becomes an OFF state.

As seen from the above description, the ON and OFF operation of the transistor Q2 is controlled by the driving transistor Q3. Then, a leakage of a current from the collector to the base of the transistor Q2 in the OFF-state, which is generated in the conventional circuit as shown in FIG. 1, is prevented by the driving transistor Q3 in the circuit as shown in FIG. 2 according to the present invention. Therefore the loss occurring in the transistor Q2 decreases and then, the switching power supply with the high power-conversion-efficiency is obtained.

The parallel circuit of the resistor R3 and the capacitor C3 connected to the base of the transistor Q2 functions to limit a base current thereof and if the parallel circuit exists between the base of the transistor Q2 and the ground, it may not be arranged in the collector side of the driving transistor Q3 but in the emitter side thereof.

The diode D2 is to form a discharging path for charges stored in a base region when the transistor turns off. In the circuit as shown in FIG. 2, the cathode of the diode D2 is directly connected to the base of the transistor Q2, but its advantage is the same if it is connected to the collector of the driving transistor Q3, and it may be arranged so as to form a current path in parallel between the collector and the emitter of the driving transistor Q3. However, depending on the situation, this diode D2 may be removed from the circuit.

In addition, the diode D1 is in a conducting state for a short time until the transistor Q2 turns on after the switching transistor Q1 turns off, the high voltage in which the input voltage $V_{In}$ and the flyback voltage is superposed, is supplied to the load RL only during a period of the conducting state, and then, the switching transistor Q1 and the transistor Q2 are protected from the high voltage. However, depending on a specification of the switching power supply, the diode D1 may be removed from the circuit.

Figure 3:
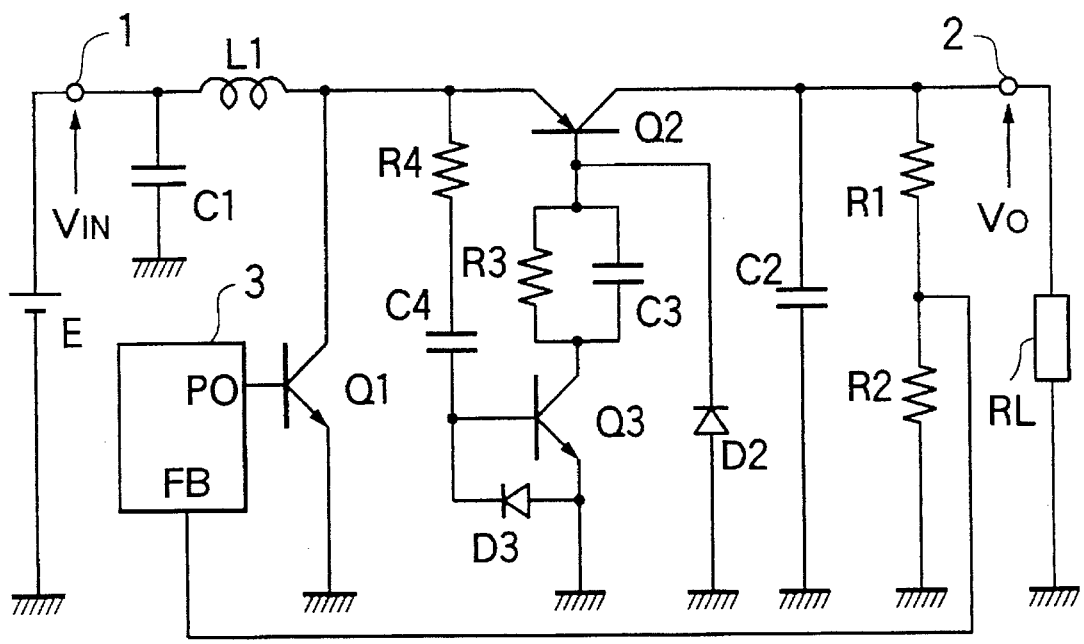
FIG. 3 shows a circuit of a switching power supply according to a second embodiment of the present invention.

FIG. 3 illustrates a second embodiment of the switching power supply according to the present invention. There are three different points between a switching power supply as shown in FIG. 3 and that of the second embodiment in FIG. 2. and those are: to connect a R-C series circuit additionally connecting the capacitor C4 to the R4, between the emitter of the transistor Q2 and the base of the driving transistor Q3; to connect a diode D3 so as to connect the base of the driving transistor Q3 to a cathode of the diode D3, instead of the resistor R5, between the base and the emitter of the driving transistor Q3; and to remove the diode D1 connected between the collector and the emitter of the transistor Q2. The other circuit structures in FIG. 3 are the same as that in FIG. 2. In such circuit structures, a switching power supply functions as a back-boost type converter.

First, in case that the input voltage $V_{in}$ is lower than an output voltage $V_o$ to obtain, the operation of this switching power supply is as follows.

When the switching transistor Q1 turns off by a signal from the control circuit 3, a flyback voltage generates in the choke coil L1. This a flyback voltage is superposed on the input voltage $V_{IN}$, and a superposed high voltage supplies to the collector of the switching transistor Q1 and the emitter of the transistor Q2, and also supplies to the base of the driving transistor Q3 through the series circuit comprising the resistor R4 and the capacitor C4. Accordingly, the driving transistor Q3 turns on because a forward bias is applied between the base and the emitter thereof.

When the driving transistor Q3 becomes an ON state, as a forward bias is applied between the emitter and the base of the transistor Q2, and the transistor Q2 also turns on, and the high voltage is supplied to the load RL so that the flyback voltage is superposed on the input voltage $V_{in}$.

In due time, when the switching transistor Q1 turns on, the voltages of both the collector of the switching transistor Q1 and the emitter of the transistor Q2 drop, and simultaneously a voltage supplying to the base of the driving transistor Q3 also drops. Thus, the driving transistor Q3 turns off, and transistor Q2 becomes an OFF state because the forward bias between the emitter and the base thereof is released by the driving transistor Q3 being turned off.

Like this, the operation, in case that the input voltage $V_{in}$ is lower than the output voltage $V_0$ to be desired, is identical to that of the circuit as shown in FIG. 2, and the circuit functions as a booster converter.

Next, in case that an input voltage $V_{in}$ is higher than the output voltage $V_0$ to obtain, the operation is as follows.

If the output voltage $V_0$ becomes high, the control circuit 3 causes an ON period of the switching transistor Q1 to become short to suppress a rise of the output voltage $V_0$ by a stabilized function of the output voltage. Therefor in case that the input voltage $V_{in}$ is higher than the output voltage $V_0$, the switching transistor Q1 continues a switching operation that the ON period is very short.

Wherein a voltage of a direct current component is prevented from applying to the base of the driving transistor Q3 by the presence of the capacitor C4, and only a voltage of a pulsation component by the ON-and OFF operation of the switching transistor Q1 is applied to the base of the driving transistor Q3 as the control signal. Thus, the driving transistor Q3 becomes an active operation state in a non-saturated region, and controls a base current of the transistor Q2 in accordance with the switching operation of the switching transistor Q1. As a result, the transistor Q2 also becomes an active operation state in a non-saturated region, and acts an operation like a series regulator.

Thus, in ease that the input voltage $V_{IN}$ is higher than the output voltage $V_0$ to obtained, this circuit functions as a back converter and in general, as a back-boost type switching power supply.

From description mentioned above, the switching power supply as shown in FIG. 3 according to the present invention, in ease that the input voltage $V_{IN}$ is lower than the output voltage $V_0$ to obtain, can reduce the loss of the transistor Q2 as a rectifying element, similar to the embodiment as shown in FIG. 2, and can be used as the switching power supply with the high power-conversion efficiency.

In addition, the boost type switching power supply can be used as a back-boost type switching power supply and can be easily used as the switching power supply dealing with a broad input voltage by inputting a control signal to the base of the driving transistor Q3 through the capacitor C4.

Figure 4:
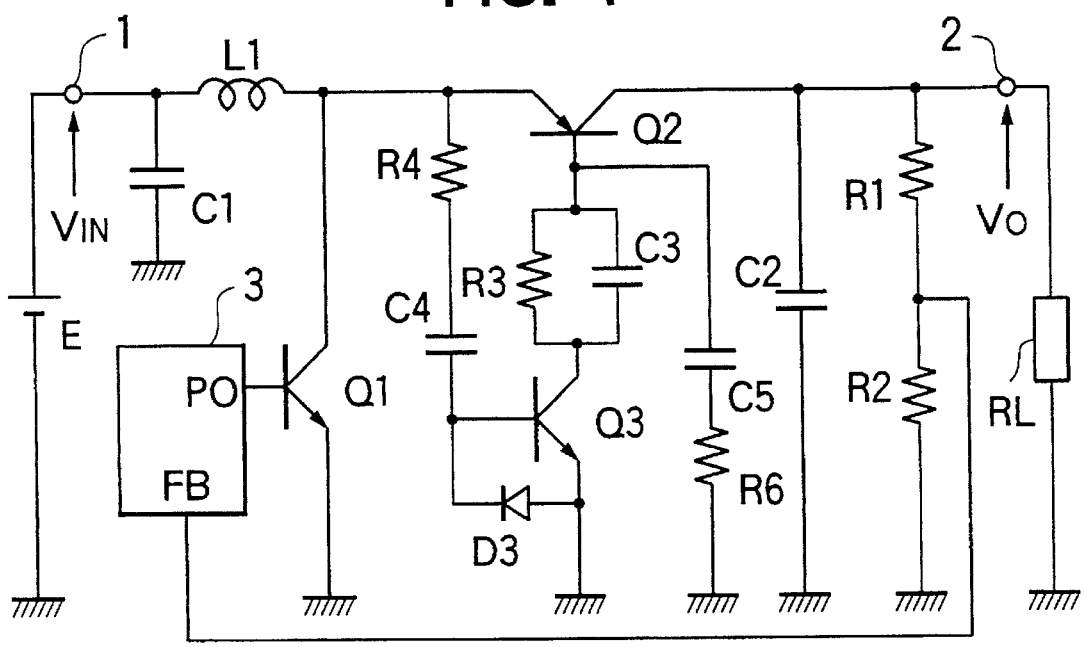
FIG. 4 shows a circuit of a switching power supply according to a third embodiment of the present invention.

FIG. 4 shows a circuit of the third embodiment of a switching power supply according to the present invention. The switching power supply as shown in FIG. 4 includes a by-pass circuit of the series circuit comprising a capacitor C5 and a resistor R6 between the base of a transistor Q2 and the ground instead of the diode D2 in the circuit of FIG. 3. The other circuit structures are identical to that in FIG. 2. The operation of the circuit in FIG. 4 are the same as that in FIG. 3 except the following points.

As well known, there exists a slight delay time in case that a transistor element turns on. Similarly, as a delay time exists in turning-on of the driving transistor Q3, a time difference has become large until finally the transistor Q2 becomes an ON state after the transistor Q1 turns off. When this time difference becomes large, both the loss and a voltage load of the switching transistor Q1 become large because a high voltage that an input voltage $V_{IN}$ and a flyback voltage $V_0$ are superposed supplies between the collector and the emitter of a switching transistor Q1 until the transistor Q2 turns on after the switching transistor Q3 turns off. A series circuit (by-pass circuit) comprising the capacitor C5 and a resistor R6 has been connected to the base of the transistor Q2. By this when the voltage of the emitter of the transistor Q2 rises, the base of the switching transistor Q1 is forward-biased even if the driving transistor Q3 is in an OFF state. Thus, it can be caused the time difference until finally the transistor Q2 becomes an ON-state after the transistor Q1 turns off to decrease, the loss of the transistor Q1 to decrease and the power conversion efficiency of the switching power supply to improve.

It should be noted that in the embodiment as shown in FIG. 4, although one end of the series circuit (by-pass circuit) comprising the capacitor C5 and the resistor R6 is connected to the base of the transistor Q2, its end may be connected to the collector of the driving transistor Q3.

In addition, it goes without saying that in the embodiment shown in FIG. 2 according to the present invention, if a series circuit comprising the capacitor C5 and the resistor R6 is connected instead of the diode D2, the same effect will be obtained.

Figure 5:
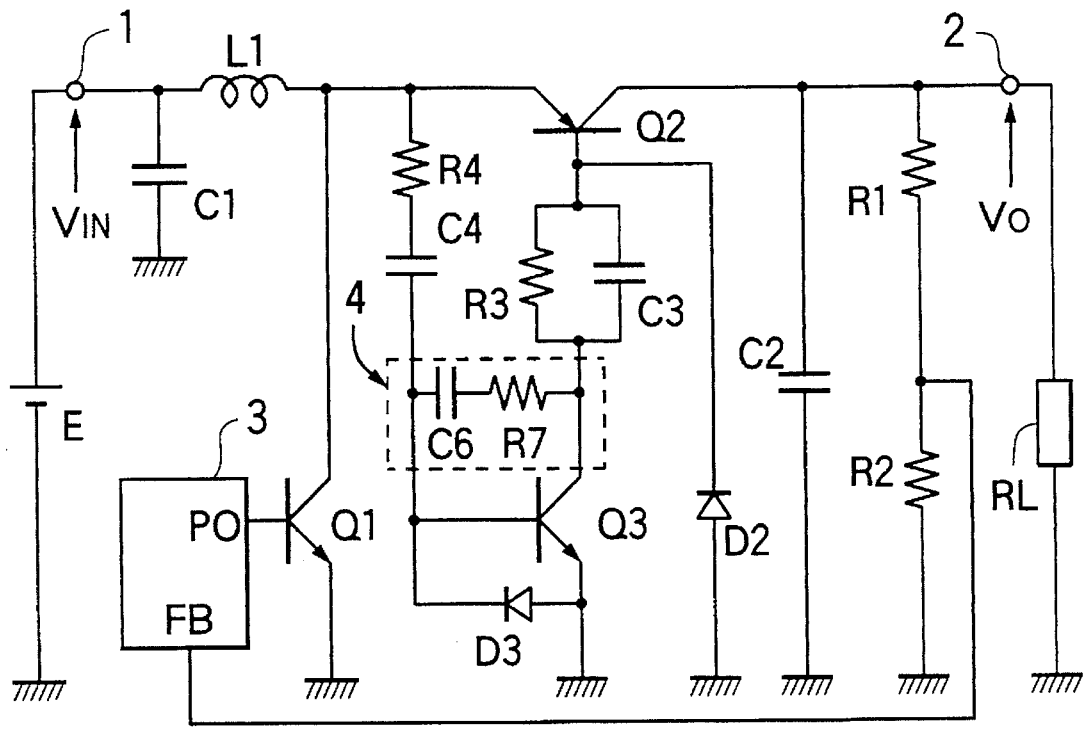
FIG. 5 shows a circuit of a switching power supply according to a fourth embodiment of the present invention.

FIG. 5 shows a fourth embodiment of the switching power supply according to the present invention.

Circuit structures of the switching power supply as shown in FIG. 5 further provide a feedback circuit 4 connected between the collector and the base of a driving transistor Q 3 to the structures in FIG. 3. An operation and a function of the switching power supply as shown in FIG. 5 are the same as that of the switching power supply as shown in FIG. 3 except the following one point.

As explained above, the switching power supply as shown in FIG. 3 is the back-boost type switching power supply. That is, when an input voltage $V_{in}$ is higher than an output voltage $V_0$ to be obtained, the driving transistor Q3 is in an active operation state in non-saturated region and a base current of the transistor Q2 has been controlled so as to make the output voltage $V_0$ constant in accordance with a switching operation of the switching transistor Q1.

In this circuit, even if an ON period of the switching transistor Q1 is the same, a control signal inputted to the base of the driving transistor Q3 through a capacitor C4 becomes large when the input voltage $V_{IN}$ is higher rather than when low. when the control signal becomes large, an operation of the driving transistor Q3 is done near a saturated region and the current introduced to its collector becomes large.

Thus, when the input voltage $V_{IN}$ that is further higher than a value of a certain voltage is inputted, the driving transistor Q3 comes to be unable to control a base current of the transistor Q2 so as to make the output voltage $V_0$ constant in accordance with the switching operation of the switching transistor Q1. That is, the driving transistor Q3 comes to operate at the saturated region, and allows the base current of the transistor Q2 to flow more than necessary.

Thus, it comes to be difficult for the transistor Q2 to maintain an active operation state at the non-saturated region, and the ON and OFF operation is done at the saturated region. When the operation of the transistor Q2 is performed at the saturated region, the output voltage $V_0$ rises over a value of the voltage to obtain. In order to suppress the rise of this output voltage $V_0$, the control circuit 3 stops the switching operation of the switching transistor Q1. When the output voltage $V_0$ drops by stopping the switching operation, the control circuit 3 controls so as to start the switching operation of the switching transistor Q1 again. However, if the switching operation starts again, the output voltage $V_0$ will rise. As a result, the switching power supply repeats stop and operation, and then, its operation becomes intermittent.

As described above, in a range that the input voltage $V_{in}$ is higher than a predetermined value, the switching power supply operates intermittently and a large ripple comes to appear in its output voltage $V_0$. Therefore, in the back-boost type switching power supply as shown in FIG. 3, there exists a upper limit in the input voltage $V_{in}$ to which a stable output voltage $V_0$ is obtained.

In the switching power supply as shown in FIG. 5, a feedback circuit 4 is arranged between the collector and the base of the driving transistor Q3. Wherein the feedback circuit 4 is a circuit for providing a feedback to the signal inputted to the base of the driving transistor Q3, thereby dropping a gain of the driving transistor Q3 and achieving a function to make a current leading to the collector small.

The driving transistor Q3 providing this feedback circuit 4 comes to be able to maintain the active operation state in the non-saturated region up to a range of the high voltage input $V_{in}$. If the driving transistor Q3 operates in the non-saturated region, a base current of the transistor Q2 is controlled properly by the driving transistor Q3, a function like a series regulator is performed. Therefore the switching power supply as shown in FIG. 5 can make the upper limitation of the input voltage $V_{IN}$ supplying the stable output voltage $V_0$ high by an action of this the feedback circuit 4, compared with the switching power supply as shown in FIG. 3.

Thus, in case that the input voltage $V_{IN}$ is lower than the output voltage $V_0$ to obtain, the switching power supply as shown in FIG. 5 according to the present invention, has a basic advantage of the invention to decrease the loss of the transistor Q2 as the rectifying element. In addition, in case that the input voltage $V_{IN}$ is higher than the output voltage $V_0$ to obtain, the switching power supply of this invention has an advantage to obtain a stable output voltage $V_0$ without intermittently switching in operation to the the input voltage $V_{IN}$ over the broad range.

Figure 6:
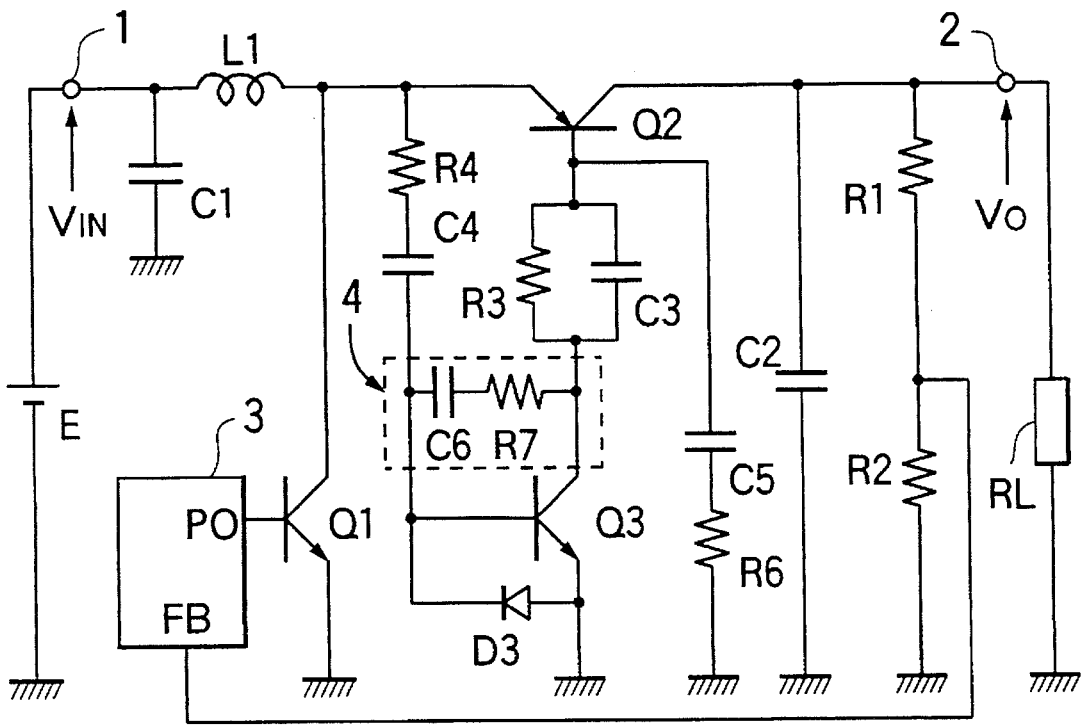
FIG. 6 shows a circuit of a switching power supply according to a fifth embodiment of the present invention.

FIG. 6 shows a fifth embodiment of the switching power supply according to the present invention. The circuit structures of the switching power supply as shown in FIG. 6 comprise a feedback circuit 4 connected between the collector and the base of the driving transistor Q3 in the same manner as the switching power supply as shown in FIG. 5. In this embodiment, the series circuit (by-pass circuit) comprising a capacitor C5 and a resistor R6 is connected between the base of the transistor Q2 and the ground like in FIG. 4 instead of the diode D2 in the circuit as shown in FIG. 5 to allow the transistor Q2 to operate with high speed.

Operations, function and advantages to be obtained in the switching power supply as shown in FIG. 6 are the same as those in FIG. 5 and their explanation is omitted here.

It should be noted that in the embodiments of the switching power supply as shown in FIGS. 5 and 6 according to the present invention, each feedback circuit 4 is formed with the series circuit comprising the resistor R7 and the capacitor C6, but it may be formed with only capacitor according to constants of various characteristics of the transistor or the other circuit structural elements.

Figure 7:
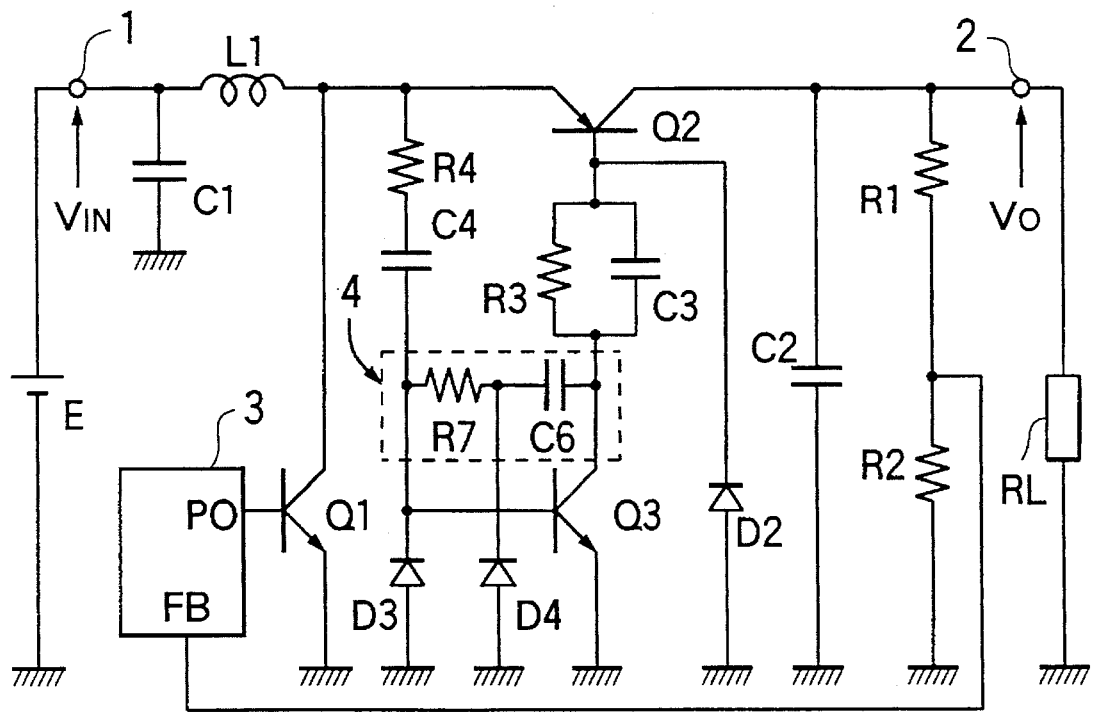
FIG. 7 shows a circuit of a switching power supply according to a sixth embodiment of the present invention.

FIG. 7 shows a sixth embodiment of the switching power supply according to the present invention. The circuit structures as shown in FIG. 7 provides the circuit structures in FIG. 3 to further a feedback circuit 4 comprising a series circuit comprising a resistor R7 and a capacitor C6 connected between the collector and the base of a driving transistor Q3, and a diode D4 connected between a connection point of the resistor R7 and the capacitor C6 and a low potential point such as the ground. Wherein the capacitor C6 of the feedback circuit is disposed in the collector side of the driving transistor Q3 and the resistor R7 in the base side thereof. Also, the cathode of the diode D4 is connected to the ground.

The switching power supply as shown in FIG. 5 can supply a stable output voltage $V_O$ without operating intermittently to an input voltage $V_{IN}$ having a value of a voltage that is higher than the output voltage $V_O$ to obtain, by an action of the feedback circuit 4.

However, unwillingly, in this switching power supply, when starting the switching power supply with the input voltage $V_{IN}$ having a value of a voltage that is higher than the output voltage $V_O$ to obtain, it is found that a value of the output voltage $V_O$ becomes a high voltage output state approximately equal to a value of the input voltage $V_{IN}$ over a long time (about several tens milliseconds) after starting. This is due to that at starting of the this switching power supply, a partial current of the base current of the transistor Q2 flowing into through the feedback circuit 4 as well as a current of a control signal inputted through the capacitor C4 are supplied to the base of the driving transistor Q3 until a charging of the capacitor C6 of the feedback circuit 4 is completed.

As well known, a transistor element allows a current being a current amplification factor $h_{FE}$ times a current flowing into a base to flow to the collector. Thus, by a synthetic current, flowing to the base of the driving transistor Q3, of a current based on a control signal and a partial current of the base current of the transistor Q2, the driving transistor Q3 allows a current, that is sufficient for the transistor Q2 to operate in a saturated region, to flow to the collector of the the driving transistor Q3. Therefore, it would be understood that the transistor Q2 becomes an ON state and the input voltage $V_{in}$ appears as the output voltage $V_O$ as it is.

Then, the switching power supply as shown in FIG. 7 allows a partial current of the base current of the transistor Q2 charging the capacitor C6 of the feedback circuit 4 to flow to the diode D4 when starting by the higher input voltage $V_{in}$ than the output voltage $V_O$ to obtain. Therefore, the partial current of the base current of the transistor Q2 is prevented from flowing into the base of the driving transistor Q3. The value of the output voltage. $V_O$ is prevented from being kept at a high voltage output state that a value of the output voltage $V_O$ becomes approximately equal to the input voltage $V_{IN}$ over a long time after starting.

It should be noted that the switching power supply as shown in FIG. 7 operates in the same manner as in FIG. 5 in an usual operation after starting.

Therefore, the switching power supply as shown in FIG. 7 according to the present invention has a basic advantage to cause the loss of the transistor Q2 as a rectifying element to decrease in ease that the input voltage $V_{in}$ is higher than the output voltage $V_O$ to be obtained. In addition, in ease that the input voltage $V_{IN}$ is lower than the output voltage $V_O$ to be obtained, this switching power supply has a second advantage to be able to obtain a stable output voltage $V_O$ without causing an intermittent operation to the input voltage $V_{IN}$ over a wide range. Further, this switching power supply has a third advantage that the output voltage $V_O$ is prevented from being kept at a high voltage output state over a long time when starting the power supply by the input voltage $V_{in}$ that is higher than the output voltage $V_O$ to be obtained.

In the embodiment as shown in FIG. 7, it has a form that the diode D4 together with the resistor R7 of the feedback circuit 4 is connected between the base and the emitter of the driving transistor Q3. Also, it is formed so that a voltage $V_{BE}$ between the base and the emitter of the driving transistor Q3 and a forward dropping voltage $V_F$ have a temperature characteristics in the same direction. Further, an additional advantage would be obtained that the operation of the switching power supply remains stable against a change of the temperature.

In order to confirm the operation of the switching power supply according to the present invention, the the switching power supply of the circuit as shown in FIG. 5 had been structured experimentally on a substrate, and a change of the output voltage at a starting time was observed. As a result, it was found that the output voltage was in a high voltage state over a value of the output voltage to be obtained during approximately 80 ms after starting.

As compared with this, it is found that the time that the output voltage is kept at the high voltage state is 1 ms after starting, and its property was improved greatly if the diode (D4) as shown in FIG. 7 is additionally arranged in the circuit on the same substrate.

It should be noted that as compared with the circuit as shown in FIG. 4, the same advantage as that of the switching power supply as shown in FIG. 7 can be also obtained in the switching power supply of a circuit structure comprising the diode D4 and the feedback circuit 4 consisting of the resistor R7 and the capacitor C6.

We claim:

1. In a switching power supply for obtaining a desired D.C. power by storing an energy in an inductor element when a switching element is in a turn-off state, transferring an input energy from the outside and a discharging energy of said inductor element to an output through a rectifying element, and causing an on-duty of said switching element to change, the switching power supply comprising:

a transistor rectifying element consisting of a PNP type bipolar transistor, connected between said inductor element and an output terminal;

a driving transistor consisting of an NPN type bipolar transistor, connected between a base of said transistor rectifying element and a low potential point such as the ground, for driving said transistor rectifying element according to a control signal supplied from a connection point of said transistor rectifying element and said inductor element; and a capacitor element, connected between a base of said driving transistor and said connection point of said transistor rectifying elements and said inductor element, for leading said control signal to a base of said driving transistor.

2. The switching power supply according to claim 1, and further comprising a by-pass circuit, connected between said base of said transistor rectifying element and said low potential point such as the ground, thereby discharging charges stored in a base region of said transistor rectifying element when said switching element turns on.

3. The switching power supply according to claim 2, wherein said by-pass circuit consists of a series circuit of a resistor and a capacitor.

4. The switching power supply according to claim 1 further comprising a feedback circuit, disposed between a base and a collector of the driving transistor, for applying a negative feedback to a signal inputted to the base of the driving transistor.

5. The switching power supply according to claim 4 wherein said feedback circuit consists of a series circuit of a resistor and a capacitor.

6. The switching power supply according to claim 1 comprising:

a feedback circuit including a series circuit comprising a resistor and a capacitor, disposed between a collector and a base of the driving transistor, the capacitor being arranged in a collector side of the driving transistor and the resistor in a base side thereof; and a diode, a cathode thereof being connected to a connection point of the capacitor and the resistor, and an anode thereof being connected to a low potential point such as the ground.

7. The switching power supply according to claim 4, wherein said feed back circuit consists of a capacitor.

* * * * *

UNITED STATES PATENT AND TRADEMARK OFFICE
CERTIFICATE OF CORRECTION

PATENT NO. : 5,574,357

DATED : November 12, 1996

INVENTOR(S) : Tetsushi Otake and Noriyuki Yoshizawa

It is certified that error appears in the above-indentified patent and that said Letters Patent is hereby corrected as shown below:

Abstract, line 8, "ad" should be --and--.

Abstract, line 9, "ad" should be --and--.

Column 2, line 3 after "type", "a" should be deleted insert --of--

Column 2, line 8, From" should be --for--.

Column 2, line 29 after "used", --as-- should be inserted.

Column 3, line 25, "uses" should be --used--.

Column 3, line 56 after "used", --as-- should be inserted.

Column 4, line 9, "realized" should be --realizes--.

Column 4, line 26 after "comprising", "a" should be deleted.

Column 4, line 32 after "is", --connected-- should be inserted.

Column 4, line 38 after "is" --connected-- should be inserted.

Column 4, line 41 after "is", --connected-- should be inserted.

Column 6, line 27, "Therefor" should be --Therefore--.

UNITED STATES PATENT AND TRADEMARK OFFICE
CERTIFICATE OF CORRECTION

PATENT NO. : 5,574,357
DATED : November 12, 1996
INVENTOR(S) : Tetsushi Otake and Noriyuki Yoshizawa It is certified that error appears in the above-indentified patent and that said Letters Patent is hereby corrected as shown below:

Column 6, line 44 after "40", --be-- should be inserted.

Column 6, line 43, "ease" should be --case--.

Column 6, line 50 after "to", --be-- should be inserted.

Column 7, line 1, "ease" should be --case--.

Column 7, line 53, "when" should be --When--.

Column 8, line 16, "a upper" should be --an upper--.

Column 9, line 58, "an" should be --a--.

Column 9, line 62, "ease" should be --case--.

Column 9, line 63, "ease" should be --case--.

UNITED STATES PATENT AND TRADEMARK OFFICE
CERTIFICATE OF CORRECTION

PATENT NO. : 5,574,357

DATED : November 12, 1996

INVENTOR(S) : Tetsushi Otake and Noriyuki Yoshizawa

It is certified that error appears in the above-indentified patent and that said Letters Patent is hereby corrected as shown below:

Column 10, line 12, "characteristics" should be --characteristic--.

Column 10, lines 55, "leading" should be --conducting-- per Examiner's Amendment.

Signed and Sealed this

Twentieth Day of May, 1997

Attest:

Attesting Officer

BRUCE LEHMAN

Commissioner of Patents and Trademarks